United States Patent [19]
Arend et al.

[11] Patent Number: 5,727,918
[45] Date of Patent: Mar. 17, 1998

[54] LOADER FOR BULK SHIP

[75] Inventors: Jürgen Arend, Saarbrücken; Horst Steckel, St. Ingbert, both of Germany

[73] Assignee: PWH Anlagen & Systeme GmbH, St. Ingbert, Germany

[21] Appl. No.: 634,910

[22] Filed: Apr. 19, 1996

[30] Foreign Application Priority Data

May 5, 1995 [DE] Germany .................. 195 16 471.7

[51] Int. Cl.⁶ ........................................ B65G 67/60
[52] U.S. Cl. ........................ 414/140.4; 414/140.9; 198/818; 198/831
[58] Field of Search ....................... 198/818, 819, 198/823, 831; 414/137.4, 139.4, 140.2, 140.8, 140.9, 141.1, 141.2, 141.8, 143.1

[56] References Cited

U.S. PATENT DOCUMENTS

| | | | |
|---|---|---|---|
| 2,125,088 | 7/1938 | Sinden | 414/140.9 |
| 3,198,353 | 8/1965 | McDowell | 414/140.9 |
| 3,292,773 | 12/1966 | Keehart | 198/823 |
| 3,627,111 | 12/1971 | Hillinger | . |
| 4,932,516 | 6/1990 | Andersson | 198/823 |
| 5,232,327 | 8/1993 | Steckel | 414/140.9 |

FOREIGN PATENT DOCUMENTS

| | | | |
|---|---|---|---|
| 2 235 231 | 7/1973 | Germany | . |
| 23 42 322 | 4/1975 | Germany | . |
| 29 49 864 | 7/1981 | Germany | . |
| 39 23 442 | 1/1991 | Germany | . |
| 3923442 | 1/1991 | Germany | 198/823 |
| 40 25 336 | 10/1991 | Germany | . |
| 44 32 772 | 5/1995 | Germany | . |
| 2204848 | 11/1988 | United Kingdom | 198/823 |

*Primary Examiner*—Karen B. Merritt
*Assistant Examiner*—Gregory A. Morse
*Attorney, Agent, or Firm*—Herbert Dubno; Andrew Wilford

[57] ABSTRACT

An apparatus for loading bulk material into a ship has a carriage movable alongside the ship, an elongated outrigger tube having an inner end on the carriage and an outer end and provided internally with a longitudinally extending partition subdividing the tube into an upper compartment and a lower compartment, and an elongated tensioning element extending longitudinally above the outrigger tube, connected to the outer end thereof, and supporting the outrigger tube. An endless outrigger conveyor belt has a U-section upper stretch riding in the upper compartment on the partition and a lower stretch riding on an inside wall of the outrigger tube in the lower compartment. The outrigger belt is driven to advance the upper stretch from the inner end to the outer end. A looped endless supply belt deposits bulk material onto the upper stretch of the outrigger belt at the inner end of the outrigger tube. A tubular outlet chute has an upper end pivoted on the outer end of the outrigger tube and a lower end positionable in the ship.

10 Claims, 2 Drawing Sheets

LOADER FOR BULK SHIP

FIELD OF THE INVENTION

The present invention relates to a bulk loader. More particularly this invention concerns a bulk loader used to fill a ship, normally a barge, with bulk material such as coal, ore, or grain.

BACKGROUND OF THE INVENTION

A bulk-ship loader typically has a carriage that can move along a pier or dock adjacent a ship to be loaded and that has a looped supply belt that moves the bulk material from a storage location to a point adjacent the ship. At this point the material is dropped onto the inner or land end of a conveyor that extends on an outrigger to a location above the ship where it is dumped into the hold. A chute can be provided to conduct the material into the hold. Such systems are described in German patent publication 2,342,322 of Herms, 2,949,864 of Haubert, 4,025,336 of Steckel, and 4,432,772 of Arend.

These devices are differently constructed and operated in accordance mainly with the types of bulk material being handled. There are three main types:

Those with telescoping rigid outriggers that can be raised and lowered,

Those with a turntable and means for raising, turning, and lowering the outrigger, and Combined systems with a telescoping outrigger mounted on a turntable.

These systems usually use conveyor belts although some materials are moved by means of auger arrangements or are even entrained by air.

To protect surroundings it is known, for example from German 2,234,231 of Mund and German 3,923,442 of Stankovicc-Gansen to enclose the belt and as described in U.S. Pat. No. 3,627,111 of Hillinger to run the conveyor belt on special guides. These systems are typically aimed at controlling the generation of dust which is potentially explosive and harmful to breathe. Frequently a separate vacuum system is provided to aspirate any dust generated. Even so such systems are frequently fairly messy and hazardous to operate.

OBJECTS OF THE INVENTION

It is therefore an object of the present invention to provide an improved bulk-ship loading system.

Another object is the provision of such an improved bulk-ship loading system which overcomes the above-given disadvantages, that is which generates minimal dust and that accurately deposits the bulk material in the hold of a ship.

SUMMARY OF THE INVENTION

An apparatus for loading bulk material into a ship has according to the invention a carriage movable alongside the ship, an elongated outrigger tube having an inner end on the carriage and an outer end and provided internally with a longitudinally extending partition subdividing the tube into an upper compartment and a lower compartment, and an elongated tensioning element extending longitudinally above the outrigger tube, connected to the outer end thereof, and supporting the outrigger tube. An endless outrigger conveyor belt has a U-section upper stretch riding in the upper compartment on the partition and a lower stretch riding on an inside wall of the outrigger tube in the lower compartment. The outrigger belt is driven to advance the upper stretch from the inner end to the outer end. A looped endless supply belt deposits bulk material onto the upper stretch of the outrigger belt at the inner end of the outrigger tube. A tubular outlet chute has an upper end pivoted on the outer end of the outrigger tube and a lower end positionable in the ship.

Since the outrigger belt is inside the laterally closed outrigger tube, it is possible to use a belt for any type of goods, whether or not they are prone to generating dust. The circular or even polygonal-section outrigger tube is self supporting so that, except for the overhead tensioning element, it is a fairly slim item that can move easily relative to the ship it is loading. The bulk material is enclosed all the way from the dock to the ship's hold, so one can even load fragile materials like wheat in bad weather without having to worry about it getting wet and spoiling.

According to the invention the outrigger tube is provided with longitudinally extending and replaceable slide elements supporting the belt stretches. Since the lower or return stretch of the belt is also enclosed, it is protected from the weather and any dust or powder on it will not be released to the surroundings. The return stretch slides in the tube so that the weight of the normally provided support-roller system is eliminated, making the outrigger that much lighter and easier to handle. If the slide elements wear out, they can easily be replaced.

An actuator and knee-lever system is braced between the outrigger tube and the carriage for pivoting the outrigger tube on the carriage about an horizontal axis at the tube inner end. This axis is positioned centrally above the supply belt where it deposits the bulk material on the outrigger belt. Such an arrangement, as compared to the prior-art winch systems, uses a short stroke of the actuator, normally a hydraulic cylinder, to get much greater movement of the outrigger outer end.

Similarly according to the invention an actuator-and knee-lever system are braced between the outrigger tube and the chute tube for pivoting the chute tube about a horizontal axis on the outrigger tube. The outrigger tube does not telescope; it is of fixed length. Even so it can reach wherever it is needed due to the pivoting at both ends, that is to reach close when its outer end is raised and to reach far when it is oriented horizontally. What is more, the pivoting at the inner end allows the outrigger to follow tidal movements easily. There is no pivoting of the outrigger about a vertical axis; instead its inner end is moved horizontally.

A door is provided at a lower outlet end of the outlet chute, and a spring is braced against the door and urges same into a closed position. The outlet chute has an angled lower end provided with a driven feed auger. Thus the bulk material does not simply pour violently out of the chute, but will move more gently with, of course, less generation of dust.

Another actuator in accordance with the invention is provided for displacing the carriage horizontally adjacent the ship. A roof is provided over the supply belt to shield the bulk goods before entering the outrigger tube.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
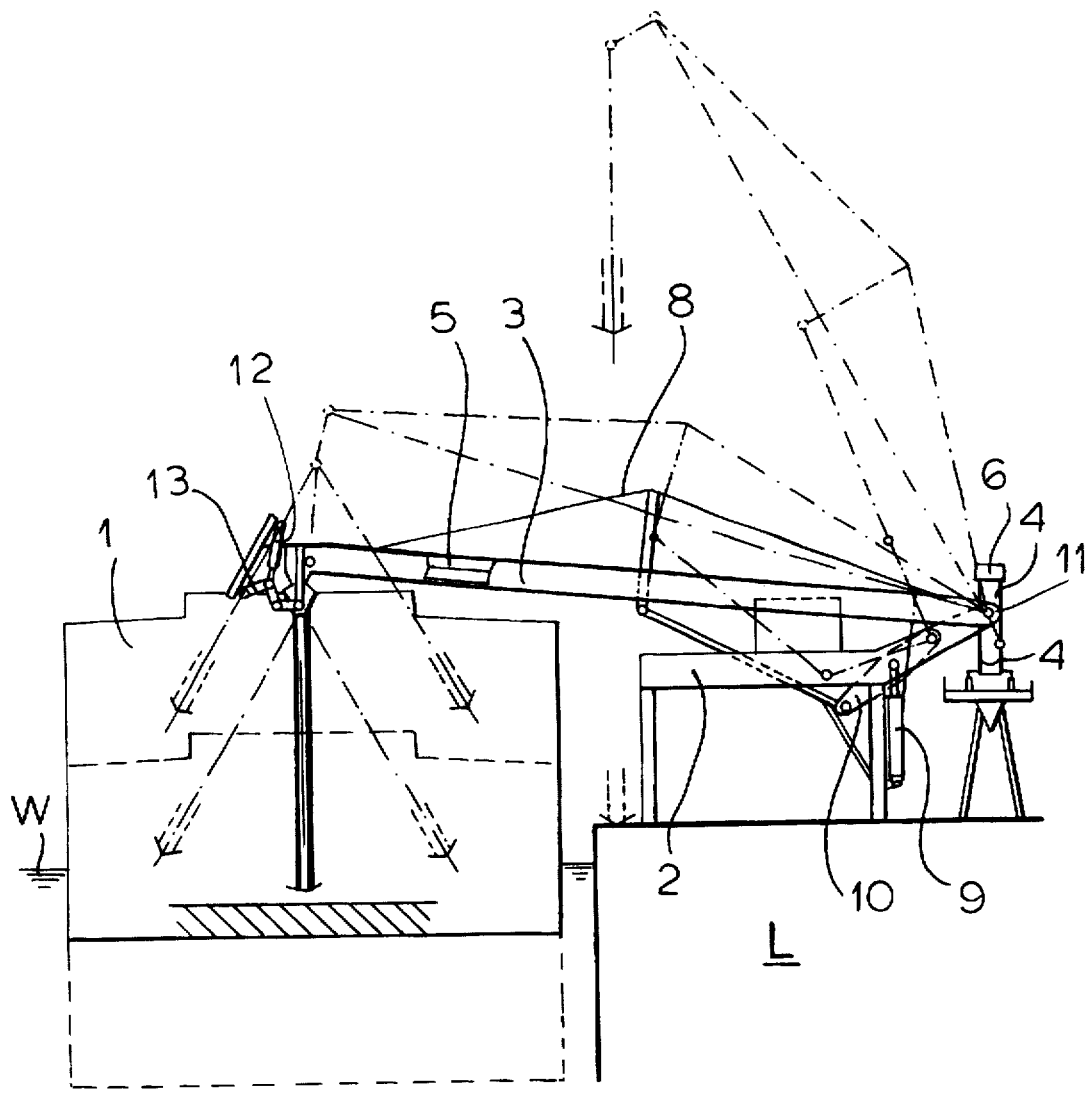
FIG. 1 is a small-scale and partly schematic end view of the system of this invention.
Figure 2:
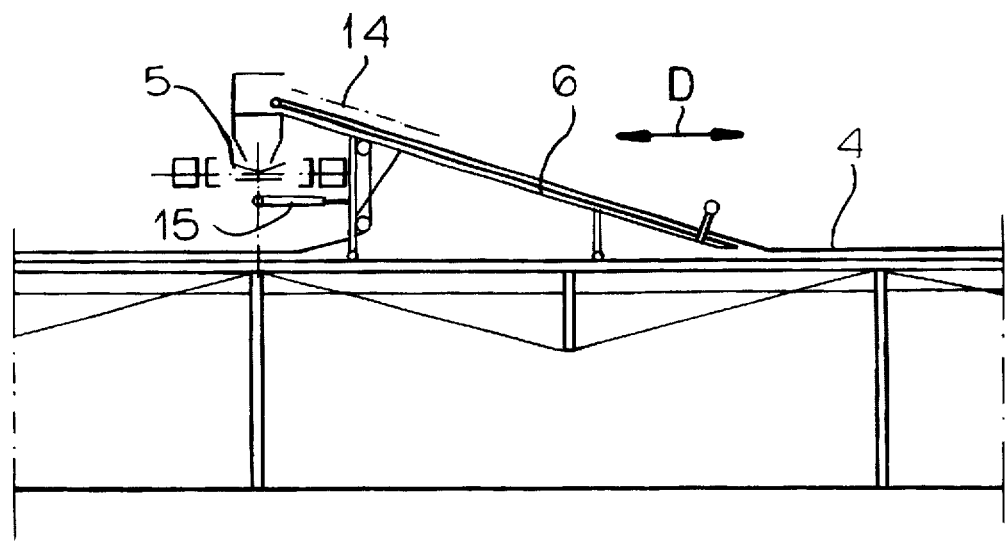
FIG. 2 is a side view of the loading system.

As seen in FIG. 1 a ship 1 sits in a body W of water next to a dock L. A portal-type carriage 2 is movable in a direction D (FIG. 2) parallel to the ship 1. A supply belt 4 formed into a loop over a looping carriage 6 deposits bulk material onto a belt 5 having an upper stretch 5' (FIG. 3) and a lower stretch 5" extending along inside an outrigger tube 3. At its outer end the tube 3 is provided with a downwardly extending tubular outlet chute 7 through which the bulk material M drops into the hold of the ship 1.

A cable-type support system 8 has an outer end coupled to the outer end of the outrigger 3, a middle braced down against the outrigger 3 and against a knee-lever system 10, and an inner end secured at a pivot 11 defining a horizontal pivot axis for the outrigger 3, as indicated by the alternate positions shown in dot-dash lines. A hydraulic cylinder 9 braced between the portal support 2 and the knee-lever system 10 can effect this movement of the outrigger 3.

Similarly another hydraulic cylinder 12 is braced via another knee-lever system 13 between the outer end of the outrigger tube 3 and the outlet-chute tube 7 to pivot it about an axis parallel to the pivot axis 11 and to the direction D so that the lower end of the chute 7, which is of fixed length and laterally closed like the outrigger tube 3, can reach into the corners of the hold of the ship 1. The joint between the outrigger tube 3 and outlet tube 7 is completely closed so that any dust generated is enclosed and the bulk material M is protected from the elements, and a roof shown schematically at 14 is provided to protect it on the belt 4. Another hydraulic cylinder 15 is provided for horizontally displacing the loop 6 of the belt 4 to keep it above the inner end of the belt 5.

Figure 3:
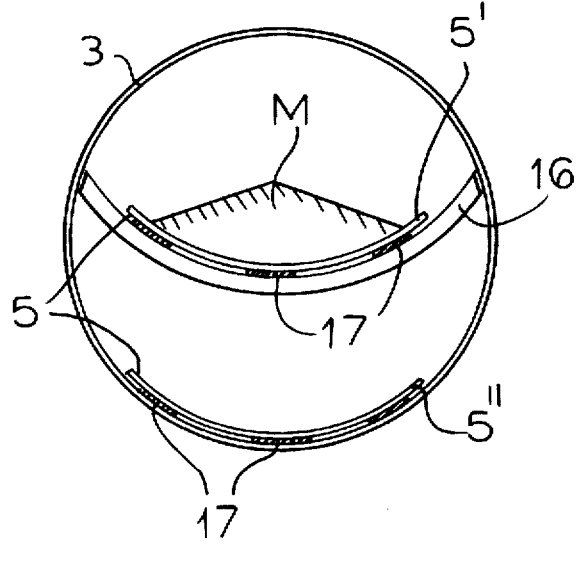
FIG. 3 is a larger-scale cross section through the outrigger of the system.

As shown in FIG. 3 the tube 3 is circular and is provided internally with a U-section partition 16 on which the upper stretch 5' of the belt 5 is supported on replaceable slide strips 17 of plastic or wear-resistant steel. Similar such strips 17 are provided between the lower stretch 5" and the inner wall of the tube 3.

Figure 4:
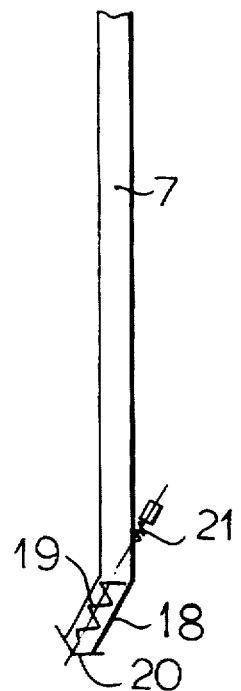
FIG. 4 is a small-scale and partly schematic side view of the outlet chute.

FIG. 4 shows how the outlet chute tube 7 has an angled lower end 18 provided internally with a driven auger 19 and with an end cap 20 normally held closed by a spring 21. Thus the material M will exit at low speed under accurate control and will not generate a lot of dust.

We claim:

1. An apparatus for loading bulk material into a ship, the apparatus comprising:

a carriage movable alongside the ship;

an elongated laterally closed outrigger tube having an inner end on the carriage and an outer end and provided internally with a longitudinally extending partition subdividing the tube into a laterally closed upper compartment and a laterally closed lower compartment;

an elongated tensioning element extending longitudinally above the outrigger tube, connected to the outer end thereof, and supporting the outrigger tube;

an endless outrigger conveyor belt having a U-section upper stretch riding in the upper compartment on the partition and a lower stretch riding on an inside wall of the outrigger tube in the lower compartment, the outrigger belt being driven to advance the upper stretch from the inner end to the outer end;

means including a looped endless supply belt for depositing bulk material onto the upper stretch of the outrigger belt at the inner end of the outrigger tube; and a tubular outlet chute having an upper end pivoted on the outer end of the outrigger tube and a lower end positionable in the ship.

2. The bulk-loading apparatus defined in claim 1 wherein the outrigger tube is provided with longitudinally extending and replaceable slide elements supporting the belt stretches.

3. The bulk-loading apparatus defined in claim 1, further comprising means including an actuator and knee-lever system braced between the outrigger tube and the carriage for pivoting the outrigger tube on the carriage about an horizontal axis at the tube inner end.

4. The bulk-loading apparatus defined in claim 3 wherein the axis is positioned centrally above the supply belt where it deposits the bulk material on the outrigger belt.

5. The bulk-loading apparatus defined in claim 1, further comprising means including an actuator and knee-lever system braced between the outrigger tube and the chute tube for pivoting the chute tube about a horizontal axis on the outrigger tube.

6. The bulk-loading apparatus defined in claim 1, further comprising a door at a lower outlet end of the outlet chute; and a spring braced against the door and urging same into a closed position.

7. The bulk-loading apparatus defined in claim 1 wherein the outlet chute has an angled lower end provided with a driven feed auger.

8. The bulk-loading apparatus defined in claim 1, further comprising means including an actuator for displacing the carriage horizontally adjacent the ship.

9. The bulk-loading apparatus defined in claim 1 further comprising a roof over the supply belt.

10. An apparatus for loading bulk material into a ship, the apparatus comprising:

a carriage movable horizontally alongside the ship in a travel direction;

an elongated and laterally closed outrigger tube having an inner end pivoted about a horizontal axis parallel to the direction on the carriage and an outer end and provided internally with a longitudinally extending U-section partition subdividing the tube into a laterally closed upper compartment and a laterally closed lower compartment;

means including an actuator operatively connected between the carriage and the outrigger tube for pivoting same about the horizontal axis and thereby raising and lowering the outrigger-tube outer end;

an elongated tensioning cable extending longitudinally above the outrigger tube, connected to the outer end thereof, and supporting the outrigger tube;

an endless outrigger conveyor belt having a U-section upper stretch riding in the upper compartment on the partition and a lower stretch riding on an inside wall of the outrigger tube in the lower compartment, the outrigger belt being driven to advance the upper stretch from the inner end to the outer end;

means including an endless supply belt having a loop at the inner end for depositing bulk material onto the upper stretch of the outrigger belt at the inner end of the outrigger tube;

a laterally closed tubular outlet chute having an upper end pivoted on the outer end of the outrigger tube and a lower end positionable in the ship; and means including an actuator braced between the tubes for pivoting the outlet chute about a horizontal axis on the outer end of the outrigger tube and thereby horizontally displacing the out-let-tube lower end in the ship.

* * * * *